(12) United States Patent
An et al.

(10) Patent No.: US 12,077,080 B2
(45) Date of Patent: Sep. 3, 2024

(54) MULTI-JOINT DRIVEN CONSOLE BOX FOR CONSTRUCTION EQUIPMENT

(71) Applicants: Gugsoo An, Changwon-si (KR); Youngmin Ahn, Changwon-si (KR); Kihyun Kim, Changwon-si (KR)

(72) Inventors: Gugsoo An, Changwon-si (KR); Youngmin Ahn, Changwon-si (KR); Kihyun Kim, Changwon-si (KR)

( * ) Notice: Subject to any disclaimer, the term of this patent is extended or adjusted under 35 U.S.C. 154(b) by 324 days.

(21) Appl. No.: 17/495,060

(22) Filed: Oct. 6, 2021

(65) Prior Publication Data

US 2022/0194278 A1 Jun. 23, 2022

(30) Foreign Application Priority Data

Dec. 21, 2020 (KR) .................. 10-2020-0179329

(51) Int. Cl.
*B60N 2/75* (2018.01)
*E02F 9/20* (2006.01)

(52) U.S. Cl.
CPC .............. *B60N 2/773* (2018.02); *B60N 2/77* (2018.02); *E02F 9/2004* (2013.01)

(58) Field of Classification Search
CPC . B60N 2/773; B60N 2/77; B60N 2/24; B60N 2/78; B60N 2/797; B60N 2/75; E02F 9/2004; E02F 9/166; E02F 9/2037; E02F 9/2079; E02F 9/163; B60R 7/04; B60R 2011/0014; B60R 2011/0084;
(Continued)

(56) References Cited

U.S. PATENT DOCUMENTS 1,706,634 A * 3/1929 Seils ..................... G05G 1/62
128/877
3,223,193 A * 12/1965 Reynolds ........... B62D 49/0685
180/329
(Continued)

FOREIGN PATENT DOCUMENTS

JP 9-302726 A 11/1997
JP 3666678 B2 6/2005
(Continued)

OTHER PUBLICATIONS

Korean Notice of Allowance dated Jul. 22, 2021 for corresponding Korean Patent Application No. 10-2020-0179329 citing the above references.

Primary Examiner — Timothy Wilhelm
(74) Attorney, Agent, or Firm — Hauptman Ham, LLP

(57) ABSTRACT

The present invention relates to a multi-joint driven console box for construction equipment, including: a multi-joint driven forward and backward drive mechanism connected to the underside thereof; and a stand type control box connected to top of the multi-joint driven forward and backward drive mechanism, wherein the multi-joint driven forward and backward drive mechanism includes: a movable link top coupling bracket; a fixed link underside coupling bracket; a first link and a second link connected in the form of joints to the movable link top coupling bracket and the fixed link underside coupling bracket; a link plate coupled to the movable link top coupling bracket and the fixed link underside coupling bracket; and a link plate forward and backward drive mechanism disposed between the link plate and the fixed link underside coupling bracket.

6 Claims, 11 Drawing Sheets

(58) Field of Classification Search
CPC ........ B60R 2011/0085; B60Y 2200/41; E05Y 2201/686
See application file for complete search history.

(56) References Cited

U.S. PATENT DOCUMENTS

| | | | | |
|---|---|---|---|---|
| 3,369,682 A * | 2/1968 | Breault | ................ | B60P 1/6445 414/559 |
| 3,893,728 A * | 7/1975 | Holopainen | ........... | B60N 2/143 297/344.24 |
| 4,012,014 A * | 3/1977 | Marshall | ............. | B64C 13/0421 244/234 |
| 4,026,379 A * | 5/1977 | Dunn | ...................... | E02F 3/964 105/342 |
| 4,244,623 A * | 1/1981 | Hall | ........................ | A47C 1/03 297/162 |
| 4,307,913 A * | 12/1981 | Spiegelhoff | .............. | B60N 2/77 297/115 |
| 4,478,308 A * | 10/1984 | Klaassen | ............... | E02F 9/2004 180/326 |
| 4,496,190 A * | 1/1985 | Barley | ..................... | B60N 2/77 297/411.32 |
| 4,580,647 A * | 4/1986 | Peifer | ...................... | B62D 1/18 180/326 |
| 4,674,798 A * | 6/1987 | Oeth | ........................ | B60N 2/77 297/115 |
| 4,702,520 A * | 10/1987 | Whisler | ................... | B60N 2/77 297/115 |
| 4,730,691 A * | 3/1988 | Grigg | ...................... | B62D 1/22 180/326 |
| 4,822,103 A * | 4/1989 | Stenvall | ................... | A47C 7/54 248/118 |
| 4,869,337 A * | 9/1989 | Wagner | ................... | E02F 3/964 180/335 |
| 4,895,040 A * | 1/1990 | Soederberg | .............. | G05G 1/52 180/315 |
| 4,934,462 A * | 6/1990 | Tatara | ..................... | E02F 9/166 37/348 |
| 4,997,054 A * | 3/1991 | Denny | ..................... | B60N 2/77 248/118 |
| 5,052,512 A * | 10/1991 | Pakosh | .................... | B62D 1/22 180/326 |
| 5,086,869 A * | 2/1992 | Newbery | ................. | B62D 1/22 180/329 |
| 5,092,408 A * | 3/1992 | Tatara | ..................... | E02F 9/166 37/348 |
| 5,120,187 A * | 6/1992 | Weber | .................... | G05G 11/00 180/324 |
| 5,320,317 A * | 6/1994 | Hyatt | ................. | A47B 21/0371 248/118.1 |
| 5,379,663 A * | 1/1995 | Hara | ........................ | G05G 9/04 345/161 |
| 5,566,778 A * | 10/1996 | Valier | ..................... | B60N 2/767 180/336 |
| 5,597,207 A * | 1/1997 | Bergsten | ............ | A47B 21/0371 297/411.36 |
| 6,076,892 A * | 6/2000 | van Hekken | ............ | A47C 1/03 297/411.36 |
| 6,148,688 A * | 11/2000 | Nishimaki | ............... | B62D 1/18 180/326 |
| 6,164,285 A * | 12/2000 | Garberg | ................. | B60K 26/00 180/326 |
| 6,226,902 B1 * | 5/2001 | Heyne | .................... | E02F 9/2004 37/348 |
| 6,283,504 B1 * | 9/2001 | Stanley | ............. | B60R 21/01532 297/217.2 |
| 6,540,300 B2 * | 4/2003 | Piretti | ..................... | A47C 1/03 297/411.36 |
| 6,550,560 B2 * | 4/2003 | Carleton | .................. | G05G 9/047 180/89.12 |
| 6,634,453 B2 * | 10/2003 | Arthur | ..................... | G05G 1/62 180/315 |
| 6,643,577 B1 * | 11/2003 | Padgett | .................. | E02F 9/2012 318/568.18 |
| 6,736,357 B2 * | 5/2004 | Venn | .................... | F16H 59/0278 248/118 |
| 6,851,495 B2 * | 2/2005 | Sprinkle | ................. | F16H 61/47 180/338 |
| 6,971,194 B2 * | 12/2005 | McClelland | .......... | E02F 9/2004 180/326 |
| 6,971,471 B2 * | 12/2005 | Baker | ..................... | B60T 1/065 296/190.04 |
| 7,032,703 B2 * | 4/2006 | Wulfert | ............... | B60R 11/0235 297/344.13 |
| 7,036,248 B2 * | 5/2006 | Meyeres | ............... | E02F 9/2025 37/234 |
| 7,036,250 B2 * | 5/2006 | Dressler | ................ | E02F 9/2004 180/326 |
| 7,059,680 B2 * | 6/2006 | Billger | ................... | B60N 2/919 297/344.21 |
| 7,210,552 B2 * | 5/2007 | Priepke | .................... | B62D 1/10 280/771 |
| 7,243,756 B2 * | 7/2007 | Muraro | .................. | E02F 9/2012 180/326 |
| 7,283,903 B2 * | 10/2007 | Merten | ................... | E02F 9/166 307/10.6 |
| 7,290,635 B2 * | 11/2007 | Bisick | .................... | B60N 2/797 180/326 |
| 7,347,299 B2 * | 3/2008 | Billger | ................ | B66F 9/07545 180/326 |
| 7,438,318 B2 * | 10/2008 | Sano | ...................... | B60N 2/753 180/326 |
| 7,438,517 B2 * | 10/2008 | Tanaka | ............... | A01B 63/1013 180/315 |
| 7,452,032 B1 * | 11/2008 | Roleder | ................. | A61G 15/12 297/182 |
| 7,458,439 B2 * | 12/2008 | Catton | ................... | B60N 2/767 248/125.8 |
| 7,520,567 B2 * | 4/2009 | Billger | ................... | B60N 2/797 180/331 |
| 7,600,819 B2 * | 10/2009 | Armo | ..................... | B60N 2/767 297/411.3 |
| 7,641,019 B2 * | 1/2010 | Pline | ..................... | B60K 26/02 180/315 |
| 7,681,686 B1 * | 3/2010 | Klas | ...................... | B60K 26/00 180/329 |
| 7,681,687 B2 * | 3/2010 | Stander | .................... | B60P 1/54 297/411.3 |
| 7,721,840 B2 * | 5/2010 | McCord | .................... | B62D 1/12 180/402 |
| 7,726,745 B2 * | 6/2010 | Bruns | ..................... | G05G 1/62 297/411.36 |
| 7,757,806 B2 * | 7/2010 | Bower | .................... | B60N 2/06 180/326 |
| 7,784,581 B1 * | 8/2010 | Klas | ...................... | G05G 9/047 297/344.21 |
| 7,797,918 B2 * | 9/2010 | Drake | ................... | A01D 34/82 180/315 |
| 7,857,090 B2 * | 12/2010 | Ruhter | ................. | E02F 9/2004 172/781 |
| 7,878,288 B2 * | 2/2011 | Kostak | ................... | B60N 2/777 180/329 |
| 7,899,597 B2 * | 3/2011 | Vitale | ................... | E02F 9/2095 701/50 |
| 7,954,592 B2 * | 6/2011 | Miyazaki | ................ | E02F 9/2004 180/321 |
| 7,971,677 B2 * | 7/2011 | Ekren | ..................... | B60N 2/24 180/329 |
| 8,039,769 B2 * | 10/2011 | Asp | ....................... | B66F 9/0759 200/334 |
| 8,041,485 B2 * | 10/2011 | Prasetiawan | .......... | E02F 9/2004 701/50 |
| 8,052,097 B2 * | 11/2011 | Rollet | ................... | B64C 27/56 244/221 |
| 8,104,566 B2 * | 1/2012 | Harber | ..................... | E02F 9/16 180/326 |
| 8,388,262 B2 * | 3/2013 | Klein | ..................... | B60N 2/797 404/83 |

(56) References Cited

U.S. PATENT DOCUMENTS

| | | | | |
|---|---|---|---|---|
| 8,496,295 B2 * | 7/2013 | Chen | A47C 1/03 |
| | | | 297/411.31 |
| 8,651,220 B2 * | 2/2014 | Connor | E02F 9/2004 |
| | | | 180/326 |
| 8,714,049 B2 * | 5/2014 | Ast | G05G 1/04 |
| | | | 74/522 |
| 8,714,504 B2 * | 5/2014 | Vuorenoja | A61G 3/0833 |
| | | | 5/507.1 |
| 8,763,747 B2 * | 7/2014 | Jones | E02F 9/2004 |
| | | | 180/326 |
| 8,851,225 B2 * | 10/2014 | Braun | B60K 26/02 |
| | | | 180/324 |
| 8,979,175 B2 * | 3/2015 | Kim | B62D 33/0617 |
| | | | 296/190.04 |
| 9,181,680 B2 * | 11/2015 | Yamahata | E02F 3/7645 |
| 9,217,240 B2 * | 12/2015 | Shibata | E02F 9/166 |
| 9,320,360 B2 * | 4/2016 | Bauer | A47C 1/03 |
| 9,592,758 B2 * | 3/2017 | Mahler | B60N 2/777 |
| 9,707,865 B1 * | 7/2017 | Buerkle | B60N 2/38 |
| 9,758,072 B2 * | 9/2017 | Vaudt | B60N 2/206 |
| 9,816,251 B2 * | 11/2017 | Sasakawa | E02F 3/76 |
| 9,885,170 B2 * | 2/2018 | Katayanagi | E02F 9/163 |
| 10,005,377 B2 * | 6/2018 | Klieber | B60N 2/773 |
| 10,144,316 B2 * | 12/2018 | Peterson | B60N 2/14 |
| 10,227,083 B2 * | 3/2019 | Teranishi | E02F 9/2004 |
| 10,370,821 B2 * | 8/2019 | Muramoto | B62D 1/18 |
| 10,391,983 B2 * | 8/2019 | Klein | B60T 7/04 |
| 10,702,069 B2 * | 7/2020 | Pelka | B60N 2/797 |
| 10,814,746 B2 * | 10/2020 | Sailer | B62D 63/04 |
| 10,870,489 B2 * | 12/2020 | Dowty | B60N 2/77 |
| 10,994,778 B2 * | 5/2021 | Benck | E02F 9/225 |
| 11,458,872 B2 * | 10/2022 | McConoughey | B60N 2/77 |
| 11,591,770 B2 * | 2/2023 | O'Halloran | E02F 9/2004 |
| 11,642,989 B2 * | 5/2023 | Kato | E02F 9/166 |
| | | | 297/325 |
| 2002/0145325 A1 * | 10/2002 | Clevenger | G05G 1/62 |
| | | | 297/411.32 |
| 2003/0184123 A1 * | 10/2003 | Amamiya | B60N 2/797 |
| | | | 296/190.01 |
| 2006/0000656 A1 * | 1/2006 | Bisick | B60N 2/797 |
| | | | 180/272 |
| 2006/0042857 A1 * | 3/2006 | Catton | B60N 2/767 |
| | | | 180/334 |
| 2008/0277190 A1 * | 11/2008 | McCord | B62D 1/22 |
| | | | 180/443 |
| 2015/0360593 A1 * | 12/2015 | Mahler | B60N 2/767 |
| | | | 297/411.32 |
| 2017/0217343 A1 * | 8/2017 | Klieber | B60N 2/77 |
| 2021/0261205 A1 * | 8/2021 | McConoughey | B60N 2/77 |
| 2021/0261206 A1 * | 8/2021 | McConoughey | B60N 2/38 |
| 2022/0194267 A1 * | 6/2022 | Haller | B60N 2/773 |
| 2023/0158932 A1 * | 5/2023 | Lee | B60N 2/797 |
| | | | 297/411.36 |

FOREIGN PATENT DOCUMENTS

| | | |
|---|---|---|
| JP | 4286183 B2 | 6/2009 |
| JP | 5420526 B2 | 2/2014 |
| KR | 10-2016287 B1 | 8/2019 |

* cited by examiner

MULTI-JOINT DRIVEN CONSOLE BOX FOR CONSTRUCTION EQUIPMENT

CROSS REFERENCE TO RELATED APPLICATION OF THE INVENTION

The present application claims the benefit of Korean Patent Application No. 10-2020-0179329 filed in the Korean Intellectual Property Office on Dec. 21, 2020, the entire contents of which are incorporated herein by reference.

BACKGROUND OF THE INVENTION

Field of the Invention

The present invention relates to a multi-joint driven console box installed on a driver's seat of construction equipment (excavator and the like) that is capable of performing multi-joint movements, thereby being more simply installed even in a narrow area, improving the space utilization of the driver's seat, and ensuring the safety and conveniences in the use thereof.

Background of the Related Art

Generally, a console box with a control lever (remote control valve (RCV) lever) for remotely controlling devices such as a boom, an arm, a bucket, and the like is installed in an interior of a driver room of construction equipment such as an excavator and the like to place a driver's elbow thereon comfortably.

So as to avoid the interference with the driver when he or she gets on or off the excavator, further, the console box is changed in position to a given angle or direction as the power of the excavator is turned on/off or under additional control, and moreover, the console box should have a safety lever adapted to prevent malfunctions of the excavator and unexpected accidents caused by the malfunctions from occurring when the control lever is erroneously controlled due to his or her carelessness.

The means for performing the position movements of the console box and the safety lever for preventing the malfunctions of heavy construction equipment from occurring are freely designed in structure according to heavy construction equipment manufacturing companies, and one example of conventional console boxes is disclosed in Korean Patent No. 10-2016287 (entitled "Console box for excavator").

Referring to the operation (changed in position to avoid the driver's interference when he or she gets on and off the excavator) of the conventional console box, a console lever 58 first pulls, and after a safety lever 36 moves downwardly, if the console lever 58 then pulls to release a locking state of a latch device, the console box is automatically tilted by a given angle (that is, moved upwardly by a given angle) by means of a console motor 40. Otherwise, the console box is provided with a slide moving device through which the console box linearly moves backwardly along a moving screw 94 by means of an operation of a screw motor 108.

However, if the console box operates to be tilted upwards by the given angle, as disclosed in the above-mentioned conventional console box, the console box may make the space beside the driver's seat narrow to thus obstruct the driver's field of vision as well as the range of his or her movements, thereby causing many inconveniences, and besides, since the console box is tilted, the items accommodated in the console box may fall or disperse unexpectedly.

Further, if the console box moves by means of the screw motor and the slide moving device having the moving screw, the slide moving device with a relatively long length has to be installed on the underside of the console box, so that in addition to the configuration complicated, a large installation area is unnecessarily needed.

SUMMARY OF THE INVENTION

Accordingly, the present invention has been made in view of the above-mentioned problems occurring in the related art, and it is an object of the present invention to provide a multi-joint driven console box for construction equipment that is capable of performing multi-joint forward and backward movements, while avoiding a driver's interference when he or she gets on and off the construction equipment, thereby being simple in configuration, easily installed even in a narrow space, and ensuring safe horizontal movements.

To accomplish the above-mentioned objects, according to the present invention, there is provided a multi-joint driven console box for construction equipment, which is adapted to control a control lever, while comfortably placing a driver's elbow thereon, the multi-joint driven console box including: a multi-joint driven forward and backward drive mechanism connected to the underside thereof to enhance the forward and backward movements thereof through multi-joint operations; and a stand type control box connected to top of the multi-joint driven forward and backward drive mechanism, wherein the multi-joint driven forward and backward drive mechanism includes: a movable link top coupling bracket connected to underside of the stand type control box in such a manner as to be movable forwardly and backwardly; a fixed link underside coupling bracket spaced apart from the movable link top coupling bracket by a given distance in up and down directions to fixedly support the undersides of a first link and a second link; the first link and the second link spaced apart from each other by a given distance to allow one side and the other side thereof to be connected in the form of joints to the underside of the movable link top coupling bracket and the top of the fixed link underside coupling bracket; a link plate coupled to the movable link top coupling bracket corresponding to a center point between top ends of the first link and the second link and the fixed link underside coupling bracket corresponding to a center point between underside ends of the first link and the second link by means of hinge pins; and a link plate forward and backward drive mechanism disposed between the link plate and the fixed link underside coupling bracket to rotate the link plate forwardly and backwardly within a range of a given angle in an alternating manner, to operate the first link and the second link in the form of joints, and to thus move the console box forwardly and backwardly.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

Figure 1:
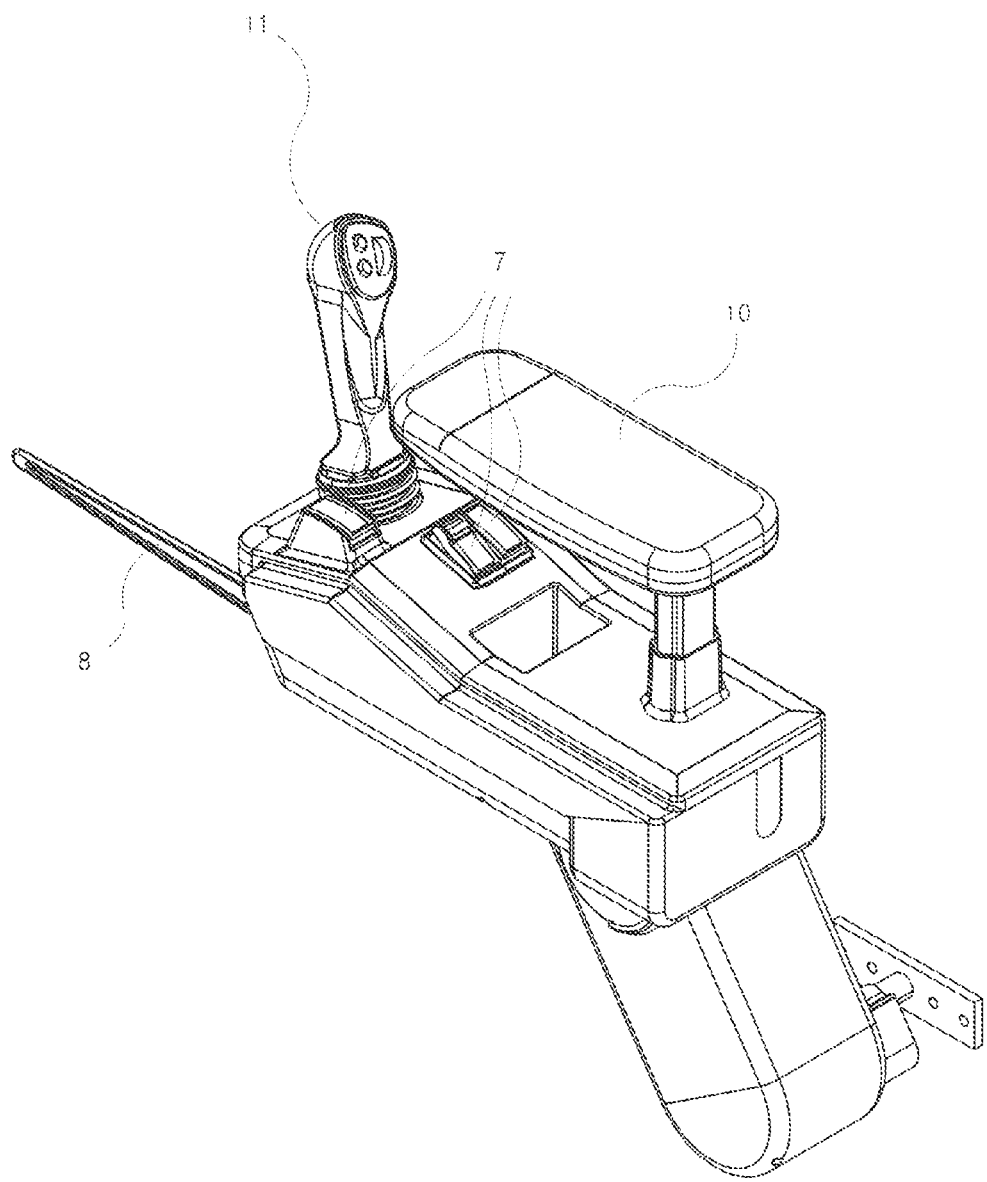
FIG. 1 is a perspective view showing a multi-joint driven console box for construction equipment according to the present invention.
Figure 2:
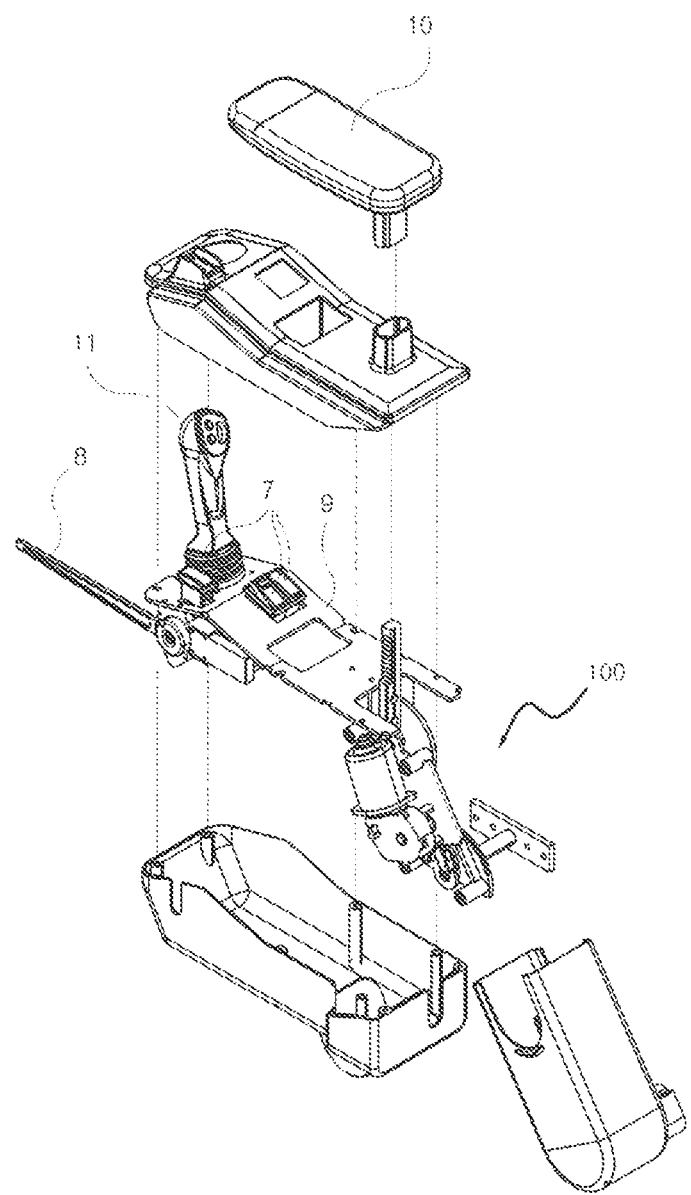
FIG. 2 is an exploded perspective view showing the external cover of the multi-joint driven console box for construction equipment according to the present invention.
Figure 3A:
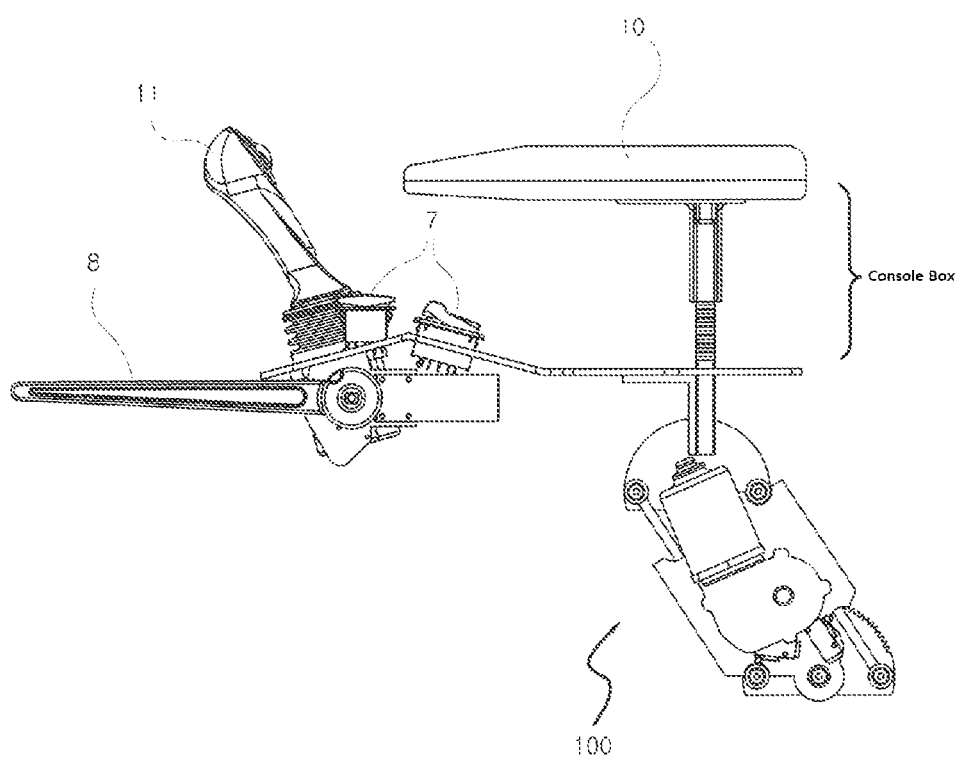
FIGS. 3A and 3B are perspective views showing the front and bottom of the multi-joint driven console box for construction equipment according to the present invention.
Figure 3B:
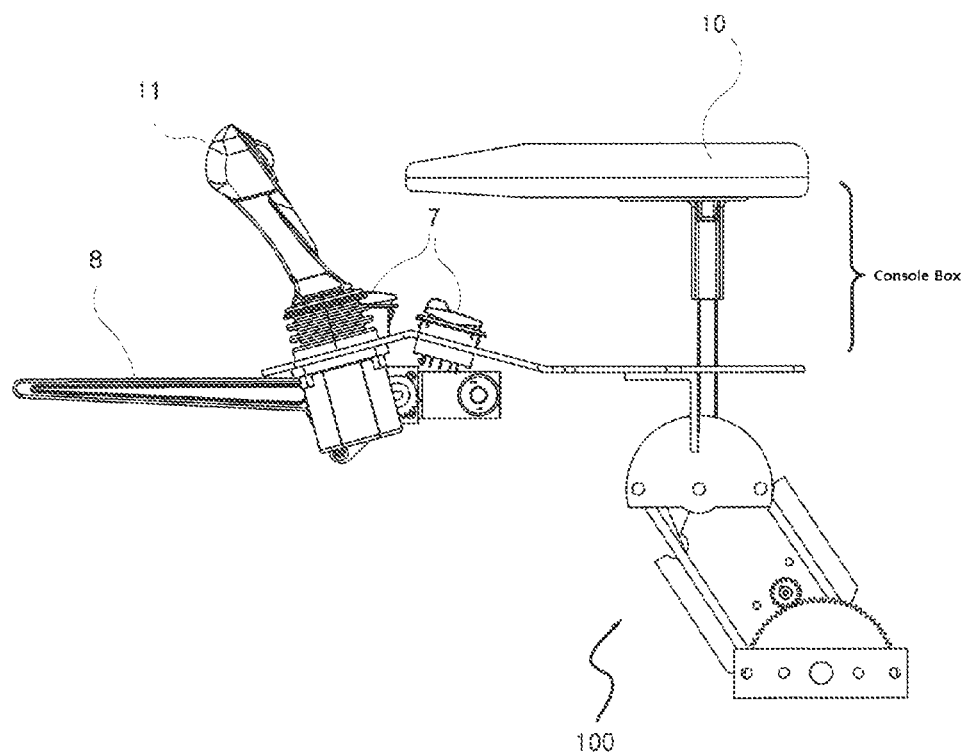
Figure 4A:
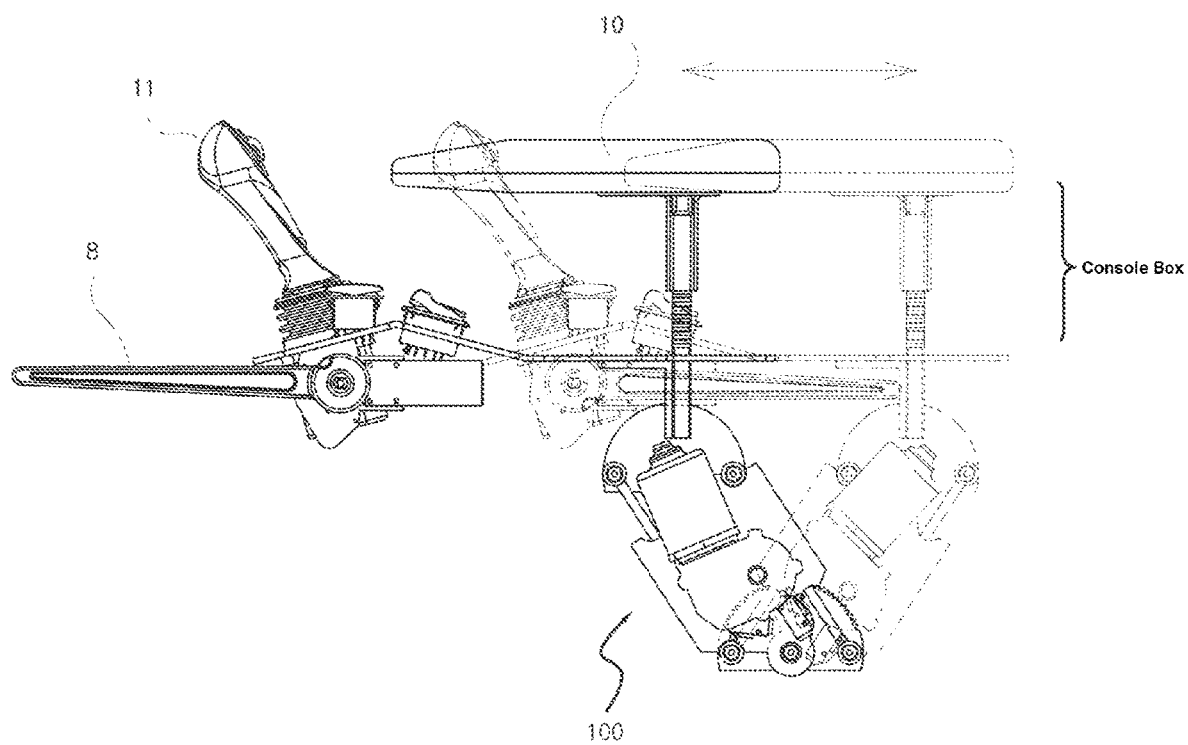
FIGS. 4A and 4B are exemplary views showing forward and backward movements of the multi-joint driven console box for construction equipment according to the present invention on the front thereof.
Figure 4B:
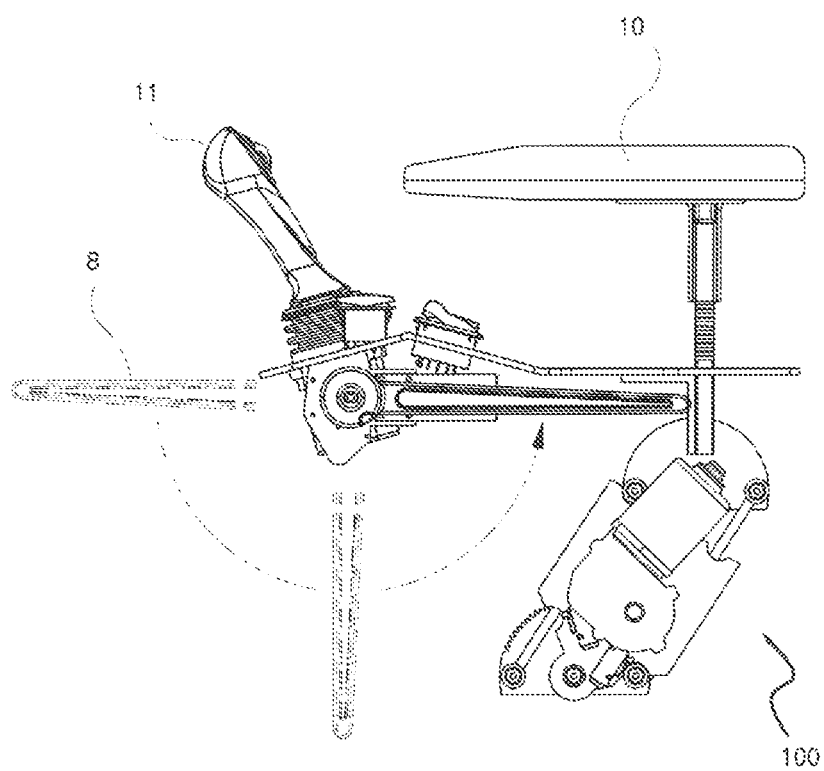
Figure 5:
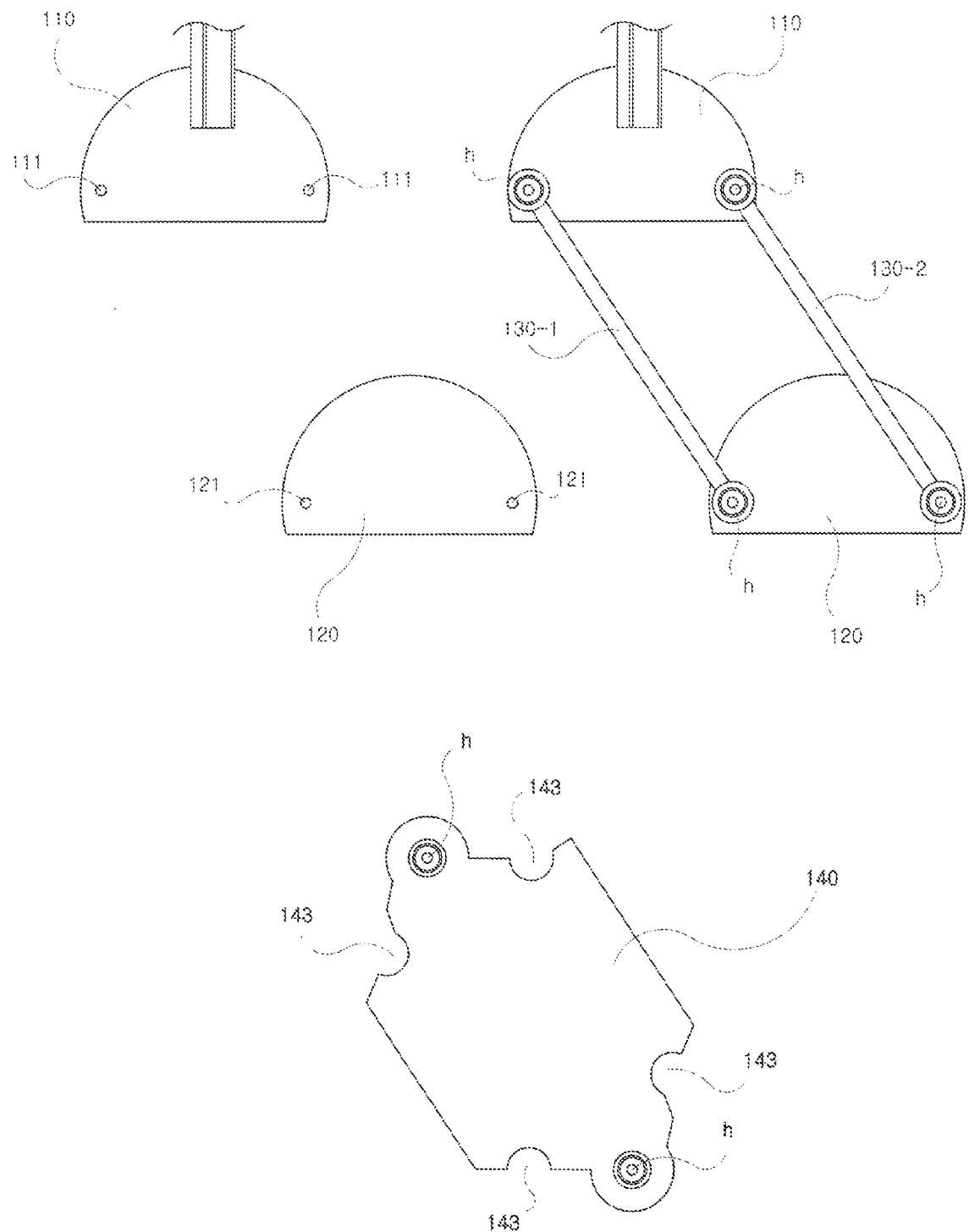
FIGS. 5 and 6 are perspective views showing the principal components coupled to one another in the order of coupling in the multi-joint driven console box for construction equipment according to the present invention.
Figure 6:
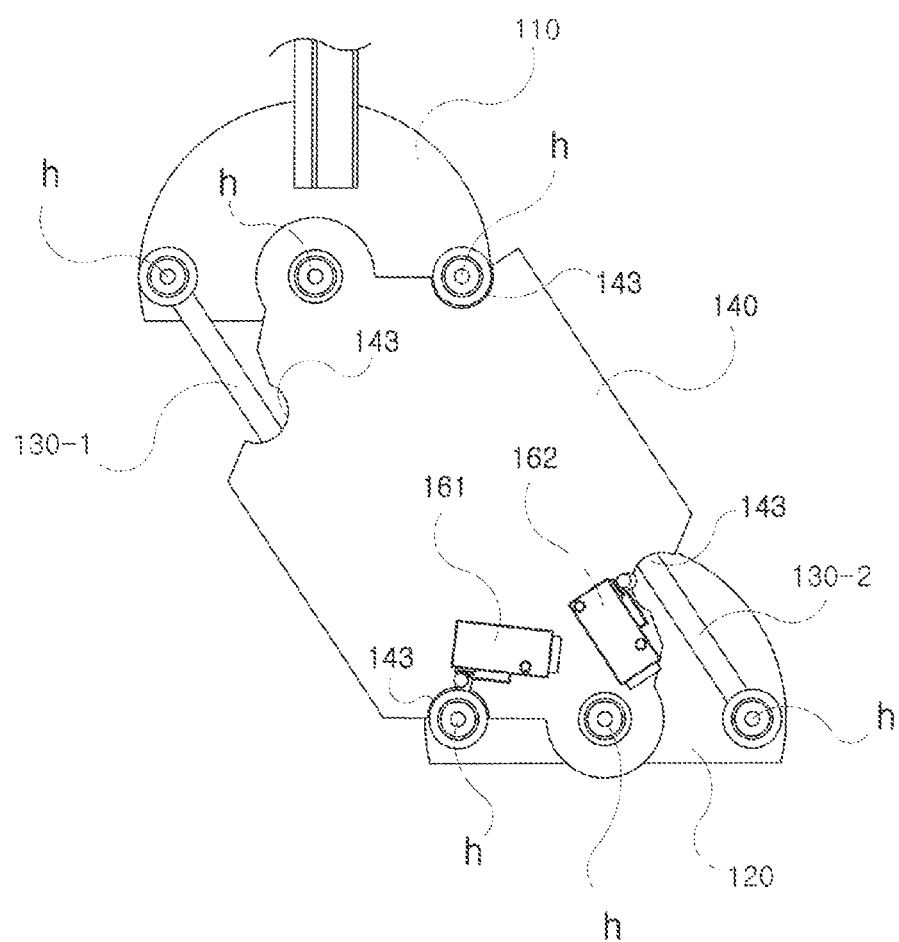
Figure 7:
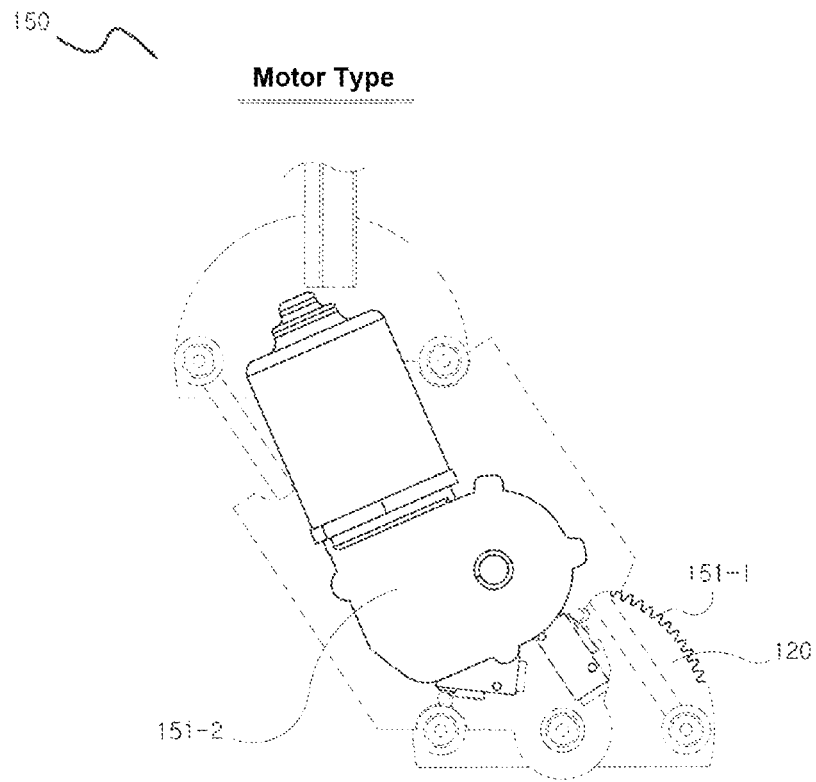
FIGS. 7 to 9 are exemplary views showing a link plate forward and backward drive mechanism of the multi-joint driven console box for construction equipment according to the present invention.
Figure 7:
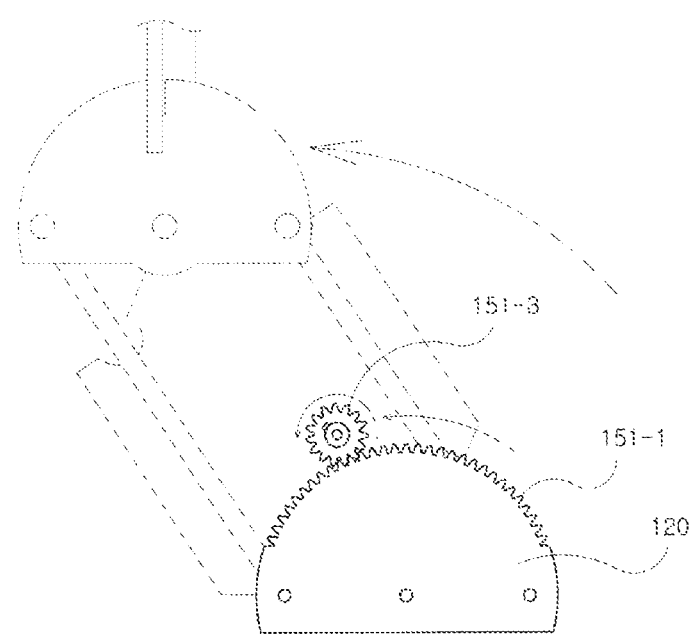
Figure 8:
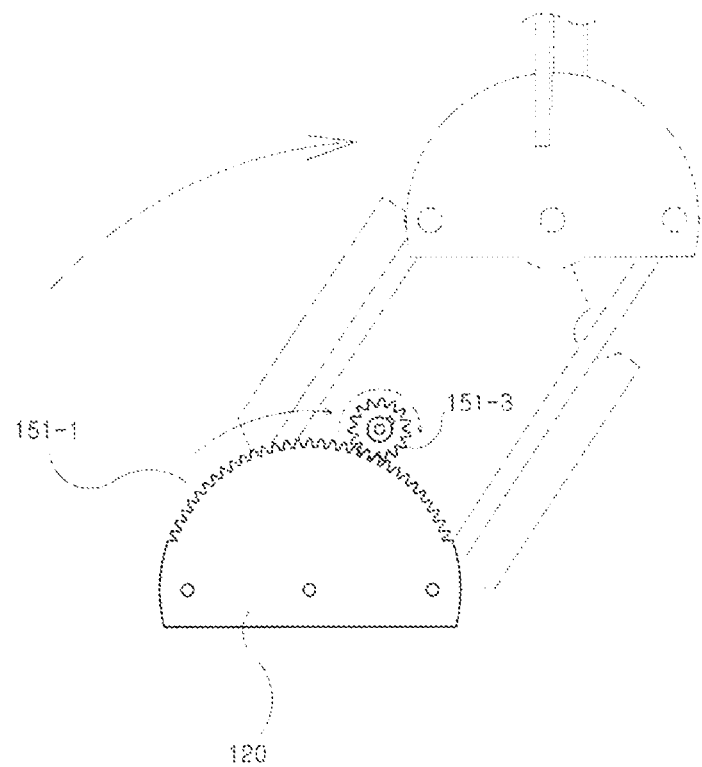
Figure 9:
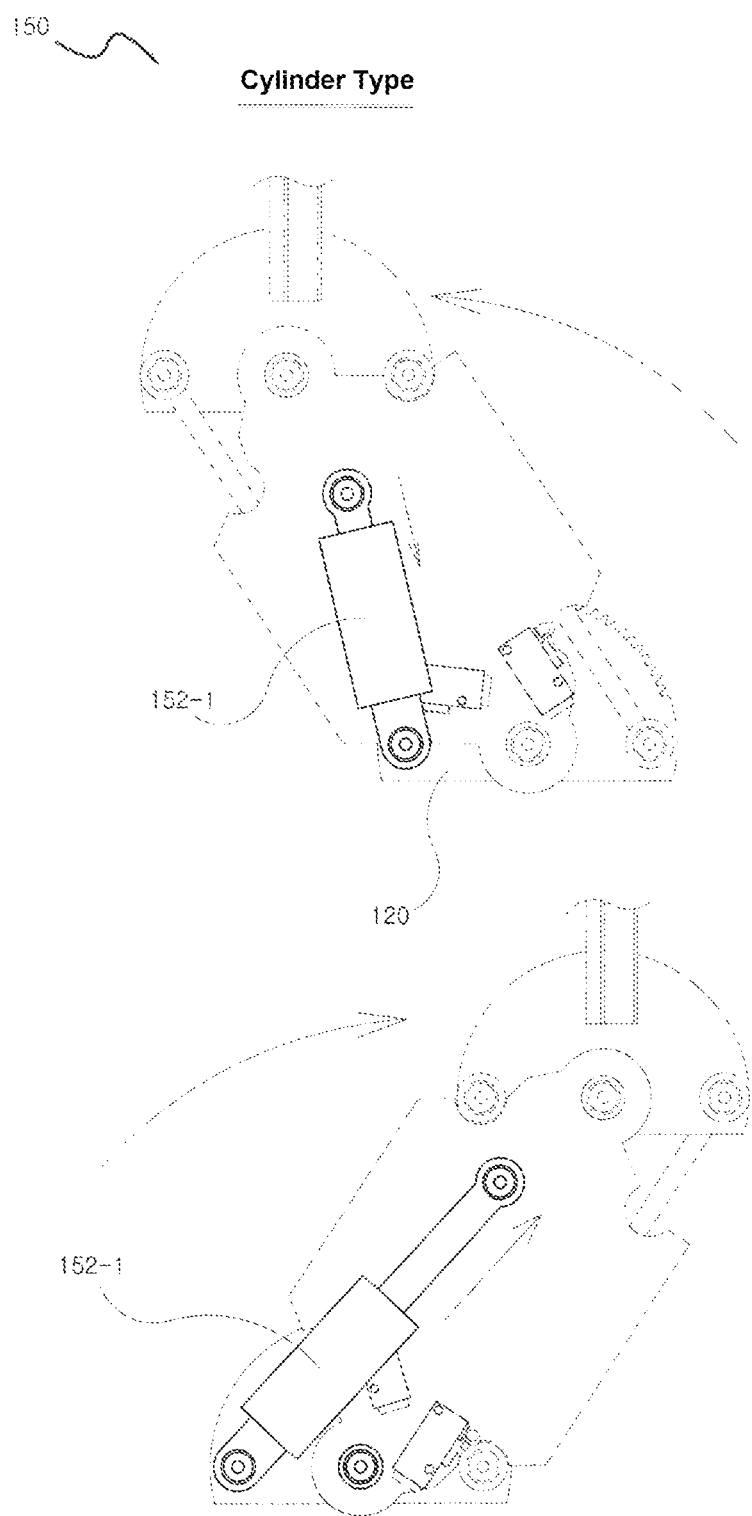

Now, an explanation on a multi-joint driven console box for construction equipment according to the present invention will be given with reference to the attached drawings.

The present invention relates to a multi-joint driven console box for construction equipment that is capable of controlling a control lever 11, while comfortably placing a driver's elbow thereon.

The console box has a multi-joint driven forward and backward drive mechanism 100 connected to the underside thereof to enhance the forward and backward movements thereof through multi-joint operations.

Further, the multi-joint driven forward and backward drive mechanism 100 is connected to a stand type control box 9 on top thereof and has a movable link top coupling bracket 110 connected to underside of the stand type control box 9 in such a manner as to be movable forwardly and backwardly.

Also, a fixed link underside coupling bracket 120 is spaced apart from the movable link top coupling bracket 110 by a given distance in up and down directions to fixedly support the undersides of a first link 130-1 and a second link 130-2.

Further, the first link 130-1 and the second link 130-2 are spaced apart from each other by a given distance to allow one side and the other side thereof to be connected in the form of joints to the underside of the movable link top coupling bracket 110 and the top of the fixed link underside coupling bracket 120.

Moreover, a link plate 140 is coupled to the movable link top coupling bracket 110 corresponding to a center point between top ends of the first link 130-1 and the second link 130-2 and the fixed link underside coupling bracket 120 corresponding to a center point between underside ends of the first link 130-1 and the second link 130-2 by means of hinge pins h.

Further, a link plate forward and backward drive mechanism 150 is disposed between the link plate 140 and the fixed link underside coupling bracket 120 to rotate the link plate 140 forwardly and backwardly within a range of a given angle in an alternating manner, so that the first link 130-1 and the second link 130-2 operate in the form of joints to allow the console box to move forwardly and backwardly.

According to the present invention, as shown, the console box includes an arm rest 10 on which a driver's elbow is placed comfortably, and under the arm rest 10 is disposed the stand type control box 9 having a joystick control lever 11, control switches 7, a safety lever 8, and a safety lever drive mechanism (not shown), while being spaced apart from the arm rest 10 by a given distance through an arm rest support shaft 10-1. The stand type control box 9 is conveniently called console box.

<Movable Link Top Coupling Bracket>

Among the components as mentioned above, the movable link top coupling bracket 110 is disposed on the underside of the stand type control box 9 and movable by the rotational operations of the two links, together with the control box 9. In this case, the movable link top coupling bracket 110 has hinge top coupling holes 111 formed spaced apart from each other by a given distance on one side and the other side thereof and thus coupled in the form of joints to top end peripheries of the first link 130-1 and the second link 130-2 through the hinge pins h fitted thereto.

<Fixed Link Underside Coupling Bracket>

The fixed link underside coupling bracket 120 is fixedly disposed under the movable link top coupling bracket 110, without being movable, while being spaced apart from the movable link top coupling bracket 110 by a given distance, and in this case, the fixed link underside coupling bracket 120 has hinge underside coupling holes 121 formed spaced apart from each other by a given distance on one side and the other side thereof, which correspond to the hinge top coupling holes 111 of the movable link top coupling bracket 110, and thus coupled in the form of joints to underside end peripheries of the first link 130-1 and the second link 130-2 through the hinge pins h fitted thereto.

<First Link and Second Link>

The first link 130-1 is coupled to the movable link top coupling bracket 110 and the fixed link underside coupling bracket 120 by means of the coupling of the hinge pins h to the hinge top coupling hole 111 formed on one side of the movable link top coupling bracket 110 and the hinge underside coupling hole 121 formed on one side of the fixed link underside coupling bracket 120, and the second link 130-2 is coupled to the movable link top coupling bracket 110 and the fixed link underside coupling bracket 120 by means of the coupling of the hinge pins h to the hinge top coupling hole 111 formed on the other side of the movable link top coupling bracket 110 and the hinge underside coupling hole 121 formed on the other side of the fixed link underside coupling bracket 120.

Accordingly, the two links, that is, the first link 130-1 and the second link 130-2 are connected in the form of joints to the movable link top coupling bracket 110 and the fixed link underside coupling bracket 120.

Further, the first link 130-1 and the second link 130-2 have the shape of a square, hexagonal, or circular bar with a given thickness and include joint coupling portions (not shown) formed on both end peripheries to which the hinge pins h are fitted.

<Link Plate>

The link plate 140 is coupled to the movable link top coupling bracket 110 corresponding to the center point between top ends of the first link 130-1 and the second link 130-2 and the fixed link underside coupling bracket 120 corresponding to the center point between underside ends of the first link 130-1 and the second link 130-2 by means of the hinge pins h, so that the link plate 140 rotates together with the first link 130-1 and the second link 130-2. Accordingly, the link plate 140 is organically interlinked with the first link 130-1 and the second link 130-2 within the radius of the rotation of the first link 130-1 and the second link 130-2, while having no interference with the rotation of the first link 130-1 and the second link 130-2.

Moreover, the link plate 140 rotates together with the first link 130-1 and the second link 130-2, while firmly holding the first link 130-1 and the second link 130-2, so that even though the first link 130-1 and the second link 130-2 have low strength or thicknesses, the link plate 140 can serve to reinforce the first link 130-1 and the second link 130-2, thereby preventing the first link 130-1 and the second link 130-2 from being damaged or broken during their operation.

As the link plate 140 comes into contact with any one joint coupling portion formed on top and underside of the first link 130-1 and any one joint coupling portion formed on top and underside of the second link 130-2 within the maximum rotation range determined upon the forward or backward rotation, further, the link plate 140 serves as a stopper, and in addition, the link plate 140 has stopper support grooves 143 formed on four corners corresponding to the joint coupling portions of the first link 130-1 and the second link 130-2 to stop the contacts with the joint coupling portions.

Under the above-mentioned configuration of the link plate 140, if the link plate 140 rotates forwardly or backwardly by a given distance, the first link 130-1 and the second link 130-2 can move, together with the link plate 140.

<Link Plate Forward and Backward Drive Mechanism>

The link plate forward and backward drive mechanism 150 serves to rotate the link plate 140 inclusive of the first link 130-1 and the second link 130-2 forwardly and backwardly within the range of a given angle, thereby allowing the console box to move forwardly and backwardly, and as shown, the link plate forward and backward drive mechanism 150 may be constituted of any one selected from a motor type mechanism and a cylinder type mechanism.

The motor type link plate forward and backward drive mechanism 150 includes a fixed semicircular rail gear 151-1 having gear teeth formed along a given semicircular periphery of the fixed link underside coupling bracket 120, a drive motor 151-2 mounted on the link plate 140 externally connected to the fixed semicircular rail gear 151-1, and a movable external pinion gear 151-3 fitted to a rotary shaft of the drive motor 151-2 and engaging with the fixed semicircular rail gear 151-1, and accordingly, the movable external pinion gear 151-3 rotating by the drive motor 151-2 rotates forwardly and backwardly by a given angle along the semicircle of the fixed semicircular rail gear 151-1, thereby rotating the link plate 140 forwardly and backwardly.

The cylinder type link plate forward and backward drive mechanism 150 includes a cylinder 152-1 (hydraulic or pneumatic cylinder or an actuator with functions similar thereto) coupled to a point eccentric by a given distance from the center of the fixed link underside coupling bracket 120 and to a point eccentric by a given distance from the center of the link plate 140 by means of hinge pins h, so that as the cylinder 152-1 pushes and pulls, the link plate 140 can rotate forwardly and backwardly and the console box (inclusive of the arm rest and the stand type control box) can move forwardly and backwardly.

The drive motor 151-2 or cylinder 152-1 is a numerical control type drive motor or cylinder with an encoder built therein.

<First Sensor and Second Sensor>

Further, a first sensor 161 and a second sensor 162 are located on one end and the other end of the link plate 140 to sense the forward and backward rotation of the first link 130-1 and the second link 130-2, to control the drive motor 151-2 or the cylinder 152-1, and to determine the limits of the forward and backward movements of the console box.

In this case, the first sensor 161 and the second sensor 162 are located on most desirable positions of the link plate 140 so that when they are close to the left and right two joint coupling portions disposed on the undersides of the first link 130-1 and the second link 130-2 during the forward and backward rotation of the link plate 140, they can sense the forward and backward rotation of the first link 130-1 and the second link 130-2, recognize that the first link 130-1 and the second link 130-2 reach the maximum ranges rotatable, and transmit the sensed signal to the drive motor 151-2, thereby making it possible to control a quantity of rotation.

Like this, the first sensor 161 and the second sensor 162 are used to detect the information of the actual quantity of rotation necessary to control the first link 130-1 and the second link 130-2 so that the first link 130-1 and the second link 130-2 can rotate only by the given angle during the forward and backward rotation, but if the numerical control type drive motor 151-2 or cylinder 152-1 with the encoder built therein is adopted, the drive motor 151-2 or cylinder 152-1 itself can perform automatic detection for the forward and backward rotation values in real time. Therefore, it is not necessary to install the first sensor 161 and the second sensor 162 on the link plate 140.

<Explanation of Operation>

Now, an explanation of the operation of the multi-joint driven forward and backward drive mechanism 100 for the console box will be given.

In the case of the forward movement of the console box, a forward movement signal is inputted to the drive motor 151-2, and accordingly, the movable external pinion gear 151-3 engaging with the fixed semicircular rail gear 151-1 formed on the fixed link underside coupling bracket 120 rotates in one direction. As the movable external pinion gear 151-3 rotates along the semicircle of the fixed semicircular rail gear 151-1, the link plate 140 coupled to the drive motor 151-2 and the movable external pinion gear 151-3, the first link 130-1, and the second link 130-2 are tilted by a predetermined angle, and in this case, the drive motor 151-2 stops rotating by the signal received from the first sensor 161, thereby finishing the forward movement of the console box.

In the case of the backward movement of the console box, a backward movement signal is inputted to the drive motor 151-2, and accordingly, the drive motor 151-2 and the movable external pinion gear 151-3 rotate backwardly, which is contrast with the forward rotation, so that the link plate 140, the first link 130-1, and the second link 130-2 are tilted backwardly. Under the same principle as above, the backward movement of the console box can be finished.

In specific, the forward and backward movements of the console box are performed with the multi-joint movements of the first link 130-1 and the second link 130-2 around the hinge points located on top and underside thereof, during the rotation of the link plate 140, and irrespective of the tilting of the link plate 140, the first link 130-1, and the second link 130-2, accordingly, the movable link top coupling bracket 110 and the console box located to top of the movable link top coupling bracket 11 can move forwardly and backwardly, while being kept at a horizontal level.

Further, the joystick control lever 11 is disposed on the stand type control box 9 under the arm rest 10 to control the operations of the arm and boom of the excavator remotely, and the control switches 7 are disposed on the front side of the stand type control box 9 to turn on and off the operations of the console box. Also, the safety lever 8 is disposed on the front side of the stand type control box 9 to prevent malfunctions of heavy equipment and unexpected accidents caused by the malfunctions when the control lever 11 is erroneously controlled by the driver due to his or her carelessness, and in addition, the safety lever drive mechanism (not shown) is disposed in an interior of the stand type control box 9 connected to the safety lever 8 to automatically drive the safety lever 8.

In this case, the control lever 11, the safety lever drive mechanism inclusive of the safety lever 8, the control switches 7, and the multi-joint driven forward and backward drive mechanism 100 for the console box that is disposed under the stand type control box 9 operate in an interworking system through the program control of a controller inside the excavator.

That is, the console box moves forwardly if the engine of the excavator starts or the console box movement button of the control switches 7 is controlled to a forward movement mode, and if it is desired to turn on the safety lever 8 (so that it rotates forwardly and extends long forwardly) in a state where the console box moves forwardly, the safety lever button of the control switches 7 is turned on.

Contrarily, the console box moves backwardly if the engine of the excavator is turned off to stop operating or the console box movement button of the control switches 7 is controlled to a backward movement mode, and in this case, the safety lever 8 operates automatically together with the backward movement of the console box, so that the safety lever 8 extending forwardly rotates downwardly and is then tilted backwardly and hidden to the interior of the console box.

As described above, the multi-joint driven console box for construction equipment according to the present invention can be provided with the multi-joint drive mechanism capable of avoiding the driver's interference when he or she gets on and off the construction equipment, thereby being simply installed even in a relatively narrow space and ensuring gentle, simple and safe horizontal movements to contribute to the improvements in the quality and performance thereof.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A multi-joint driven console box for construction equipment, the multi-joint driven console box being configured to control a control lever while allowing a driver's elbow to be placed thereon, the multi-joint driven console box comprising:
    a multi-joint driven forward and backward drive mechanism configured to enhance forward and backward movements of the multi-joint driven console box through multi-joint operations; and
    a stand control box connected to a top of the multi-joint driven forward and backward drive mechanism,
    wherein the multi-joint driven forward and backward drive mechanism comprises:
        a movable link top coupling bracket connected to an underside of the stand control box in such a manner as to be movable forwardly and backwardly;
        a fixed link underside coupling bracket spaced apart from the movable link top coupling bracket by a given distance in up and down directions to fixedly support undersides of a first link and a second link; the first link and the second link spaced apart from each other by a given distance to allow one side of each of the first link and the second link to be connected to an underside of the movable link top coupling bracket and another side of each of the first link and the second link to be connected to a top of the fixed link underside coupling bracket;
        a link plate coupled to the movable link top coupling bracket corresponding to a center point between top ends of the first link and the second link and the fixed link underside coupling bracket corresponding to a center point between underside ends of the first link and the second link by hinge pins; and
        a link plate forward and backward drive mechanism disposed between the link plate and the fixed link underside coupling bracket to rotate the link plate forwardly and backwardly within a range of a given angle in an alternating manner, to operate the first link and the second link and to thus move the multi-joint driven console box forwardly and backwardly.

2. The multi-joint driven console box according to claim 1, wherein
    the first link is coupled to a hinge top coupling hole formed on one side of the movable link top coupling bracket and a hinge underside coupling hole formed on one side of the fixed link underside coupling bracket corresponding to the hinge top coupling hole by the hinge pins, and
    the second link is coupled to another hinge top coupling hole formed on another side of the movable link top coupling bracket and another hinge underside coupling hole formed on another side of the fixed link underside coupling bracket corresponding to the another hinge top coupling hole by the hinge pins.

3. The multi-joint driven console box according to claim 1, wherein as the link plate comes into contact with a joint coupling portion formed on top and underside of the first link and a joint coupling portion formed on top and underside of the second link within a maximum rotation range determined upon a forward or backward rotation, the link plate serves as a stopper, and
    the link plate has stopper support grooves formed on four corners corresponding to the joint coupling portions of the first link and the second link to stop the contacts with the joint coupling portions.

4. The multi-joint driven console box according to claim 1, wherein
    the link plate forward and backward drive mechanism is constituted of a motor mechanism or a cylinder mechanism,
    the motor mechanism includes
        a fixed semicircular rail gear having gear teeth formed along a given semicircular periphery of the fixed link underside coupling bracket;
        a drive motor mounted on the link plate externally connected to the fixed semicircular rail gear, and
        a movable external pinion gear fitted to a rotary shaft of the drive motor and engaging with the fixed semicircular rail gear, and
    the cylinder mechanism includes a cylinder coupled to a point eccentric by a given distance from a center of the fixed link underside coupling bracket and to a point eccentric by a given distance from a center of the link plate by the hinge pins.

5. The multi-joint driven console box according to claim 4, wherein the drive motor or cylinder is a numerical control drive motor or cylinder with an encoder built therein.

6. The multi-joint driven console box according to claim 4, wherein the link plate comprises a first sensor and a second sensor located on one end and another end thereof to sense a forward and backward rotation of the first link and the second link, to control the drive motor or the cylinder, and to determine limits of the forward and backward movements of the multi-joint driven console box.

\* \* \* \* \*